(12) United States Patent
Appleyard et al.

(10) Patent No.: US 10,157,369 B2
(45) Date of Patent: Dec. 18, 2018

(54) ROLE TAILORED DASHBOARDS AND SCORECARDS IN A PORTAL SOLUTION THAT INTEGRATES RETRIEVED METRICS ACROSS AN ENTERPRISE

(75) Inventors: James P. Appleyard, North Richland Hills, TX (US); Edwin J. Bruce, Corinth, TX (US); Romelia H. Flores, Keller, TX (US); Joshua L. Purcell, Dallas, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1517 days.

(21) Appl. No.: 12/366,326

(22) Filed: Feb. 5, 2009

(65) Prior Publication Data
US 2010/0198649 A1   Aug. 5, 2010

(51) Int. Cl.
*G06Q 10/10*  (2012.01)
*G06Q 10/06*  (2012.01)

(52) U.S. Cl.
CPC ......... *G06Q 10/10* (2013.01); *G06Q 10/0631* (2013.01); *G06Q 10/1097* (2013.01)

(58) Field of Classification Search
CPC ................. G06Q 10/063112; G06Q 10/10
See application file for complete search history.

(56) References Cited

U.S. PATENT DOCUMENTS

| | | | |
|---|---|---|---|
| 6,854,107 B2 | 2/2005 | Green et al. | |
| 7,158,940 B2 | 1/2007 | Cimral et al. | |
| 7,343,550 B2 | 3/2008 | Saidenberg et al. | |
| 7,398,471 B1 | 7/2008 | Rambacher et al. | |
| 7,448,048 B1* | 11/2008 | Nesamoney et al. | 719/318 |
| 7,493,563 B2 | 2/2009 | Bohn et al. | |
| 7,599,293 B1 | 10/2009 | Bain et al. | |
| 8,185,827 B2 | 5/2012 | Appleyard et al. | |
| 2002/0054086 A1 | 5/2002 | Van Oostenbrugge et al. | |
| 2002/0169852 A1 | 11/2002 | Schaeck | |

(Continued)

OTHER PUBLICATIONS

Madden, Ned. "Portals in a Web 2.0 World", TechNewsWorld, Feb. 26, 2008, (<http://www.technewsworld.com/story/61820.html?wlc=1317063553>, Accessed Sep. 26, 2011).*

Madden, Ned. "Portals in an Enterprise 2.0 World", CRM Buyer, Mar. 17, 2008, (<http://www.crmbuyer.com/story/62133.html>, Accessed Sep. 26, 2011).*

Shan, T.C., et al. "Service-oriented computing kit," 2006 IEEE International Conference on Services Computing, Sep. 2006.

(Continued)

*Primary Examiner* — Aryan E Weisenfeld
(74) *Attorney, Agent, or Firm* — Cuenot, Forsythe & Kim, LLC

(57) ABSTRACT

Users can be logged into an organization portal and an organization role can be determined for each user. For each user, indicators of values obtained from metrics tailored for the organization role can be presented within a plurality of metrics driven portlets of an organization portal. The plurality of metrics driven portlets can include at least one score card and at least one dashboard. Responsive to detecting that the at least one of the plurality of metrics exceeds a boundary condition, an out-of-bounds event can be triggered, a set of the users who are to be apprised of an occurrence of the out-of-bounds event can be programmatically determined, a Web data repository can be searched for items specific to the out of bounds event and, for each user in the set, contents of at least one of the portlets can be altered to include items from the Web data repository.

15 Claims, 8 Drawing Sheets

(56) References Cited

U.S. PATENT DOCUMENTS

| | | |
|---|---|---|
| 2002/0198973 A1 | 12/2002 | Besaw |
| 2003/0014560 A1 | 1/2003 | Mugica et al. |
| 2003/0107596 A1 | 6/2003 | Jameson |
| 2004/0001565 A1 | 1/2004 | Jones et al. |
| 2004/0002887 A1* | 1/2004 | Fliess et al. ............... 705/9 |
| 2004/0090969 A1 | 5/2004 | Jerrard-Dunne et al. |
| 2004/0093381 A1 | 5/2004 | Hodges et al. |
| 2004/0183831 A1 | 9/2004 | Ritchy et al. |
| 2004/0225955 A1 | 11/2004 | Ly |
| 2004/0249664 A1 | 12/2004 | Broverman et al. |
| 2005/0114502 A1 | 5/2005 | Raden et al. |
| 2005/0125772 A1 | 6/2005 | Kohno |
| 2005/0144022 A1* | 6/2005 | Evans ............... 705/1 |
| 2005/0154701 A1 | 7/2005 | Parunak et al. |
| 2005/0267789 A1 | 12/2005 | Satyadas et al. |
| 2006/0150105 A1 | 7/2006 | Bright et al. |
| 2006/0174201 A1 | 8/2006 | Zaner-Godsey et al. |
| 2006/0184883 A1 | 8/2006 | Jerrard-Dunne et al. |
| 2006/0235733 A1 | 10/2006 | Marks |
| 2006/0294215 A1 | 12/2006 | Noble et al. |
| 2007/0011126 A1 | 1/2007 | Conner et al. |
| 2007/0028175 A1 | 2/2007 | Moore et al. |
| 2007/0130561 A1 | 6/2007 | Siddaramappa et al. |
| 2007/0169016 A1 | 7/2007 | Aakolk et al. |
| 2007/0198312 A1 | 8/2007 | Bagchi et al. |
| 2007/0203766 A1 | 8/2007 | Adler et al. |
| 2007/0239573 A1 | 10/2007 | Tien et al. |
| 2008/0155424 A1 | 6/2008 | Moran et al. |
| 2008/0295164 A1* | 11/2008 | Steiner et al. ............ 726/14 |
| 2009/0113310 A1 | 4/2009 | Appleyard et al. |
| 2009/0307596 A1 | 12/2009 | Allot |
| 2009/0327429 A1* | 12/2009 | Hughes et al. ............ 709/206 |

OTHER PUBLICATIONS

Kay, M., "The BPM convergence," Strategic Finance, vol. 87, No. 15, pp. 51-55, Sep. 2006.

Wyatt, J., "Scorecards, dashboards, and KPIs keys to integrated performance measurement," Healthcare Financial Management, vol. 58, No. 2, pp. 76-80, Feb. 2004.

Coolidge, J., et al., "Visible performance," Information Age, pp. 16-17, 2004.

U.S. Appl. No. 11/925,419, Non-Final Office Action, dated Dec. 23, 2010, 15 pg.

U.S. Appl. No. 11/925,419, Final Office Action, dated May 6, 2011, 22 pg.

U.S. Appl. No. 11/925,419, Notice of Allowance, dated Jan. 20, 2012, 7 pg.

Harrop, W. et al., "Real-time Collaborative Network Monitoring and Control Using 3D Game Engines for Representation and Interaction," In Proc. of 3rd int'L. Workshop on Visualization for Computer Security, Nov. 3, 2006, pp. 31-40, ACM.

IBM, "Interface for Creating Custom, End-User, Role Based Application Interfaces," IP.com Prior Art Database Technical Disclosure, No. IPCOM000013828D, Oct. 1, 2000, 4 pg.

"SOA Workplace Portal: Emissions Dashboard", IBM Corporation, Nov. 11, 2006, 22 pg.

Chen, I.Y. et al., "An SOA-based Software Deployment Management System," In WI '06 Proc. of 2006 IEEE/WIC/ACM Int'l Conf. on Web Intelligence, 2006, 4 pg.

Suri, J. et al., "Building Mashup Portlets," Sun Microsystems, Aug. 24, 2006., 7 pg.

"A Primer on Enterprise Mashups: Productivity Drivers for the Web 2.0 Application Style," Kapow Technologies, 2007, 1 pg.

* cited by examiner

FIG. 9

ROLE TAILORED DASHBOARDS AND SCORECARDS IN A PORTAL SOLUTION THAT INTEGRATES RETRIEVED METRICS ACROSS AN ENTERPRISE

BACKGROUND

The present invention relates to the field of Web portal technologies and, more particularly, to role tailored dashboards and scorecards in a portal solution that integrates retrieved metrics across an enterprise.

Many geographically dispersed organizations capture performance metrics, which can be significant to organization functions. These metrics typically have a normal operational range within which no actions are required. When an operational range of one or more metrics exceeds established boundaries, however, decisive and rapid action is often demanded. In a large and/or distributed organization, response actions can involve numerous decisions of human agents at different management levels. Coordination among these human agents can be difficult, which can lengthen a situation response time, result in costly miscommunications, result in divergent understandings of a situation and/or a situation response, cause improper reporting/documentation of a response, or the like.

Further, any tactical decisions made in response to operational metrics should be made with strategic objectives and goals of the organization in mind. Historically, strategic goals have been the purview and concern of upper level management. However, it can take a significant time period for strategic goals to be conveyed throughout an organization's decision making hierarchy. Often, tactical decisions based upon tactical data are made without an awareness of which, if any, strategic concerns are involved.

No single information mechanism/system exists that can provide metric driven, time sensitive information to decision makers and action takers within a large distributed organization in a unified, easy to consume manner. Preexisting software tools fall short of the industry need to detect when operational metrics exceed safe boundaries and to facilitate timely, coordinated responses among key organizational decision makers and action takers. Further, preexisting software tools separate strategic and tactical concerns from one another, which results in non-optimal decisions being made with a lack of all available information of concern to the organization for which the decisions are being made.

SUMMARY

A method includes logging a plurality of users into an organization portal. The method also can include, for each of the plurality of users, determining an organization role for the user. The method also can include, for each of the plurality of users, graphically presenting, within a plurality of metrics driven portlets of an organization portal, indicators of values obtained from metrics tailored for the determined organization role of the user, the plurality of metrics driven portlets comprising at least one scorecard and at least one dashboard, each tailored for the determined organizational role and dynamically updating the scorecard and the dashboard based upon metrics provided by a plurality of discrete services. The method also can include detecting whether at least one of the plurality of metrics exceeds a boundary condition. The method also can include, responsive to detecting that the at least one of the plurality of metrics exceeds the boundary condition, triggering an out-of-bounds event, programmatically determining a set of the users who are to be apprised of an occurrence of the out-of-bounds event, searching a Web data repository for items specific to the out of bounds event and, for each user in the set of the users, altering, using a processor, contents of at least one of the portlets to include items from the Web data repository that result from searching the Web data repository, wherein the items are selected from the Web data repository based on the determined organization role for the user.

A system includes a processor programmed to initiate executable operations. The executable operations include logging a plurality of users into an organization portal. The executable operations also can include, for each of the plurality of users, determining an organization role for the user. The executable operations also can include, for each of the plurality of users, graphically presenting, within a plurality of metrics driven portlets of an organization portal, indicators of values obtained from metrics tailored for the determined organization role of the user, the plurality of metrics driven portlets comprising at least one scorecard and at least one dashboard, each tailored for the determined organizational role and dynamically updating the scorecard and the dashboard based upon metrics provided by a plurality of discrete services. The executable operations also can include detecting whether at least one of the plurality of metrics exceeds a boundary condition. The executable operations also can include, responsive to detecting that the at least one of the plurality of metrics exceeds the boundary condition, triggering an out-of-bounds event, programmatically determining a set of the users who are to be apprised of an occurrence of the out-of-bounds event, searching a Web data repository for items specific to the out of bounds event and, for each user in the set of the users, altering contents of at least one of the portlets to include items from the Web data repository that result from searching the Web data repository, wherein the items are selected from the Web data repository based on the determined organization role for the user.

A computer program includes a computer readable storage medium having program code stored thereon. The program code is executable by a processor to perform a method. The method includes logging, by the processor, a plurality of users into an organization portal. The method also can include, for each of the plurality of users, determining, by the processor, an organization role for the user. The method also can include, for each of the plurality of users, graphically presenting, by the processor, within a plurality of metrics driven portlets of an organization portal, indicators of values obtained from metrics tailored for the determined organization role of the user, the plurality of metrics driven portlets comprising at least one scorecard and at least one dashboard, each tailored for the determined organizational role and dynamically updating the scorecard and the dashboard based upon metrics provided by a plurality of discrete services. The method also can include detecting, by the processor, whether at least one of the plurality of metrics exceeds a boundary condition. The method also can include, responsive to detecting that the at least one of the plurality of metrics exceeds the boundary condition, triggering, by the processor, an out-of-bounds event, programmatically determining, by the processor, a set of the users who are to be apprised of an occurrence of the out-of-bounds event, searching, by the processor, a Web data repository for items specific to the out of bounds event and, for each user in the set of the users, altering, by the processor, contents of at least one of the portlets to include items from the Web data repository that result from searching the Web data repository, wherein the items are selected from the Web data repository based on the determined organization role for the user.

BRIEF DESCRIPTION OF THE SEVERAL VIEWS OF THE DRAWINGS

FIG. 9 illustrates a role tailored emissions portal configured for an executive level user role in accordance with an embodiment of the inventive arrangements disclosed herein.

DETAILED DESCRIPTION

Figure 1:
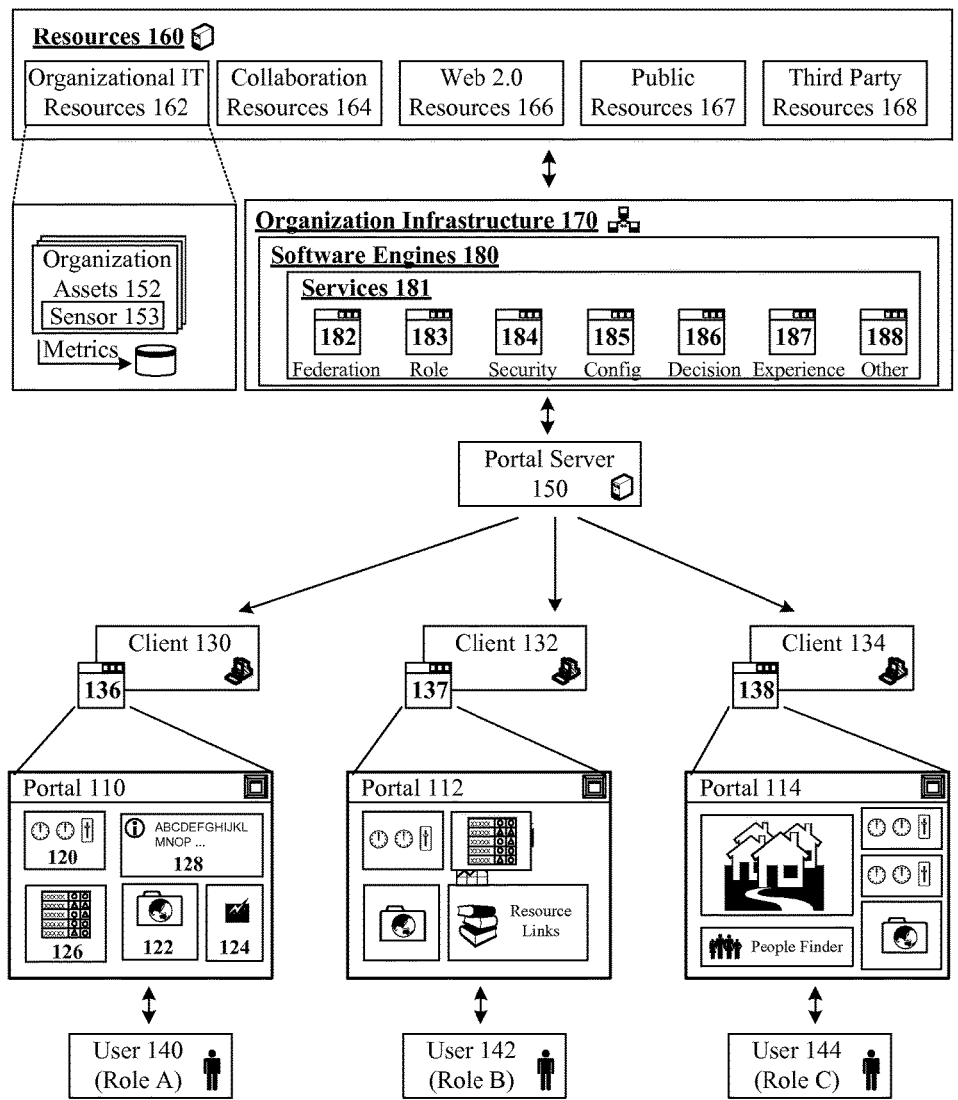
FIG. 1 is a schematic diagram of a system for a role tailored portal having multiple integrated portlets.

The disclosed solution provides a tailored user experience available through a Web portal that addresses the multiple-view, multiple-data needs of operations, supervisory, policy making, and executive personnel of an organization. Tactical and strategic concerns are represented within the Web portal, using dashboards and scorecards respectively, for example. The various roles can all be concerned with measurement/assessment of an organization's compliance with performance targets, for which metrics are gathered. The metrics can be presented in a role tailored fashion to the portal users in a near real time and/or cumulative (scorecard) manner, along with federation of analysis and trend calculation output. Business logic can be applied to the federated data and metrics to automatically initiate actions and/or suggest responses when received metrics exceed previously established boundaries, such as the safe operating range for a key performance indicator.

Collaboration tools and Web 2.0 information sharing technologies can be integrated in the portal to facilitate rapid coordinated responses and to share information across the organization. For example, online collaboration tools (e.g., instant messaging, online meeting tools, etc.) can automatically identify and/or suggest personnel to assist with a situation where metrics exceed safe operational boundaries. Web 2.0 tools can institutionalize data at many different levels, which can be searched and applied to assist with handling a metrics driven situation.

No known conventional tool leverages collaboration tools and/or Web 2.0 technologies within a portal to assist with responding to metrics driven situations having both tactical and strategic aspects. These situations can often require rapid corrective actions to ensure organizational assets are restored to a safe operating range as soon as possible. Gains achieved through integrated use of the collaboration tools and Web 2.0 technologies can be particularly valuable, as the severity of necessary corrective adjustments to restore assets to a safe operating range can geometrically expand as time from an incident causing a deviation increases. That is, continuously increasing adjustments can be required over time as a situation worsens (increasingly deviating from a safe operating range), which makes rapid and coordinated responses of critical import.

It should be noted that the coupling of scorecards with Web portal dashboards in a common environment providing additional role tailored tools results in combinative gains greater than the sum of individual component contributions. For example, portal users would potentially have access to one or both of the dashboard and scorecard layouts, data, and controls, most likely driven by their organizational roles. Operational users may find themselves in a dashboard, with dial gauges and low level, limited timeframe trending charts, along with Web 2.0 style collaborative tools and online content. Such a portal environment would help support job functions of a tactical nature, dealing with monitoring and reaction to the here and now. Managerial or executive users could in turn be sent to a scorecard environment organized along company hierarchy lines and focused on compiled measures of status, performance, and high level trends, all in service of the strategic view of a company. Still other users may find themselves with both the dashboard and scorecard environments available as "tabs" or the like on the same portal desktop.

A prime and timely opportunity for the application of such user role based multiple portal desktop options could come from the needs of electric power generating companies, which represent one contemplated embodiment of the invention. Electric power generating companies are facing increasing pressures on both their business and public stewardship fronts. The disclosed solution addresses the federation of near real time monitoring portlets together with historical data trend displays, scorecards and collaboration tools to provide an environment for proactive management of a business, with electric power generation as a non exclusive example. For that case, measurements associated with anything from plant output to safety to greenhouse gas emissions could fit into the monitored categories, and Web 2.0 collaborative tooling present in the portal environment could assist with leveraging those to make tactical and strategic decisions.

Potentially within the same example business, higher level users charged with management and strategic job functions could employ a portal based balanced scorecard environment to assess attainment of objectives and indicators relating to the same measures as before (output, safety, emissions) plus many others, but on a higher, aggregated, holistic level. The marriage of a dashboard approach such as that previously disclosed with a scorecard facility, all available within the same user role based Web portal environment and leveraging Web 2.0 style collaboration and content availability provides an integrated environment that is scalable, efficient, and capable of being rapidly adapted to organizational changes.

As will be appreciated by one skilled in the art, the present invention may be embodied as a method, system, or computer program product. Accordingly, the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The computer usable medium may include a propagated data signal with the computer-usable program code embodied therewith, either in baseband or as part of a carrier wave. The computer usable program code may be transmitted using any appropriate medium including, but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory), a rigid magnetic disk and an optical disk. Current examples of optical disks include Compact Disc-Read Only Memory (CD-ROM), Compact Disc-Read/Write (CD-R/W) and Digital Video Discs (DVDs). Other computer readable media can include a transmission medium, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the C programming language or similar. The program code may execute entirely on the user's computer, partly on the user's computer, as a stand-alone software package, partly on a user's computer and partly on a remote computer or entirely on a remote computer or server. In the latter scenario, the remote computer may be connected to the user's computer through a local area network (LAN) or a wide area network (WAN), or the connection may be made via an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a schematic diagram of a system 100 for a role tailored portal 110-114 having multiple integrated portlets 120-128. Different portals 110-114 can be served by portal server 150 to different clients 130-134 to be rendered within client-side browsers 136-138. Different portal 110-114 views and data can be tailored for users 140-144 depending upon their roles in an organization. Organizational roles can be based upon a hierarchy of organizational authority, can be based upon functional lines, and/or can be specific to particular positions. In one implementation of system 100, for example, organizational roles can include ones for operational, supervisory, policy making, and executive functions. Different ones of the users 140-144 can be presented with portals 110-114 that include one or more scorecards, one or more dashboards, and/or both scorecards and dashboards.

Each portlet 120-128 can present information in a manner that can be interactively drilled down through to various granularity levels for which a user 140-144 has authority, which can, again, vary by user role. An example of a drill down operation can come through clicking on a gauge in a metrics reporting portlet 120 to provide more/less detailed information relating to that metric. Content presented in the various portlets 120-128 can be dynamically adjusted based upon the content of other portlets 120-128 in accordance with established programmatic rules. These programmatic rules can incorporate business logic of the organization that the portals 110-114 support.

Portlets 120-128 can include a metrics portlet 120 and/or 126, a Web 2.0 portlet 122, a collaboration portlet 124, a (not shown) trends portlet, a (not shown) forecasting portlet, an alert portlet 128, and the like. Metrics portlet 120 can be a dashboard portlet, while portlet 126 can be a scorecard portlet. Additional portlets (not shown) can include, for example, a people finder portlet, a context navigator portlet, a portlet for external data streams (from resources 167 or 168 for example) customized by role, and a media presentation portlet. Different portals 110-114 can be configured to present different portlets based upon user 140-144 configured settings and/or user 140-144 role.

The business logic can be driven by current values of the metrics presented in portlet 120 and/or 126 and how these current values compare against configurable boundaries and ranges of operations. For example, when the metrics deviate from a safe operational range, business logic can trigger an out-of-bounds event. This event can cause alerts to be established in the alert portlet 128, can result in a search of documents relevant to the out-of-bounds event through the Web 2.0 portlet 122, can cause important contact information for available people needed to resolve the out-of-bounds event to appear in the collaboration portlet 124, and the like. In other words, the portals 110-114 can serve as focal points for notifying users 140-144 of out-of-bounds events, for providing necessary information to ensure a quick response, to coordinate this response across organizational personnel, and to record an organizational response in a reviewable and systematic manner.

Metrics driving this process can be based upon values captured by sensors 153 linked to organizational assets 152. These metrics can be stored in near real time and/or in an accumulative manner by organizational IT resources 162. A set of services 181 can execute, which provide the portal server 150 updates based upon the metrics handled by the organizational IT resources 162. Additional services 181 can link other resources 160, such as collaboration resources 164, Web 2.0 resources 166, public resources 167, and third party resources 168 to the portal server 150, where obtained/processed information from all of these resources 160 can be selectively presented within the portals 110-114. Collaboration resources 164 can include instant messaging resources, chat resources, online meeting resources, co-browsing resources, Voice Over Internet Protocol (VoIP) telephony resources, video conferencing resources, and the like used to permit users 140-144 to communicate. The Web 2.0 resources 166 can include, but are not limited to content management libraries or repositories, WIKIs, BLOGS, syndication feeds, folksonomies, mashups, and the like, which users 140-144 can utilize to share information with other organizational users.

As used herein, the portal server 150 can provide data and can function as a communication intermediary between the clients 130-134 and resources or data sources 160. The portal server 150 can provide near real time information to portlets 120-128, which can require constant updating. The portal server 150 can be optionally implemented as a cluster of portal servers (not shown) to provide redundancy and to enable resilient operation of system 100 should one or more portal servers 150 fail.

Each of the portals 110-114 can represent a Web site or service environment that centrally offers a broad array of resources and information for an organization, such as metrics, collaboration resources, contact information, Web 2.0 content, and the like. Each portal 110-114 can include multiple Web portlets 120-128, which can vary by a role of a user.

Each portlet 120-128 can be a reusable Web component that displays information to portal users from a designated source, which can be different from the back-end resource that provides information for the portal. An arrangement of portlets 120-128 within a portal 110-114, a presentation of information within the portal 110-114, the responsiveness of this presentation, and other user perceived factors all contribute to the user experience of the portal 110-114.

Each of the clients 130-134 can be a computing device capable of presenting Web content within a browser 136-138. Each client 130-134 can include, for example, a desktop computer, a server, a mobile telephone, a tablet computer, a personal data assistant (PDA), a digital media player, and the like. Each of the resources 160 can represent an information technology resource, such as one or more back-end systems. One of the organizational resources 162 can be sensor 153 equipped organizational assets 152. The sensors 153 can capture metrics, which can be stored in a data store, which is accessible by a data federation service 182 or other processing component, which ultimately presents the metrics in a metrics portlet 120, 126.

Each of the engines 180 can be a software program executing within an organizational infrastructure 170 that is able to perform a processing action against data from one or more of the resources 160. Processing results can be delivered to the portal server 150. In one embodiment, the engines 180 can be used to implement one or more software services 181. The services 181 can include, for example, federation services 182, role services 183, security services 184, configuration services 185, decision services 186, experience services 187, or other services 188. In one embodiment, the services 181 can be SOA services linking resources 160 to the portal server 150.

Each of the components of system 100 can be interconnected through a network (not shown). The network can include any hardware, software, and firmware necessary to convey data encoded within carrier waves. Data can be contained within analog or digital signals and conveyed though data or voice channels. The network can include local components and data pathways necessary for communications to be exchanged among computing device components and between integrated device components and peripheral devices. The network can also include network equipment, such as routers, data lines, hubs, and intermediary servers which together form a data network. The networks can further include circuit-based communication components and mobile communication components, such as telephony switches, modems, cellular communication towers, and the like. Additionally, the network can include line based and/or wireless communication pathways.

Additionally, in system 100 digitally encoded information can be stored in a plurality of data stores (not shown) which are accessible by system components. These data stores can be physical or virtual storage spaces configured to store digital information. The data stores can be physically implemented within any type of hardware including, but not limited to, a magnetic disk, an optical disk, a semiconductor memory, a digitally encoded plastic memory, a holographic memory, or any other recording medium. Each data store can be a stand-alone storage unit as well as a storage unit formed from one or more physical devices. Additionally, information can be stored within the data stores in a variety of manners. For example, information can be stored within a database structure or can be stored within one or more files of a file storage system, where each file may or may not be indexed for information searching purposes. Further, the data stores can optionally utilize one or more encryption mechanisms to protect stored information from unauthorized access.

Figure 2:
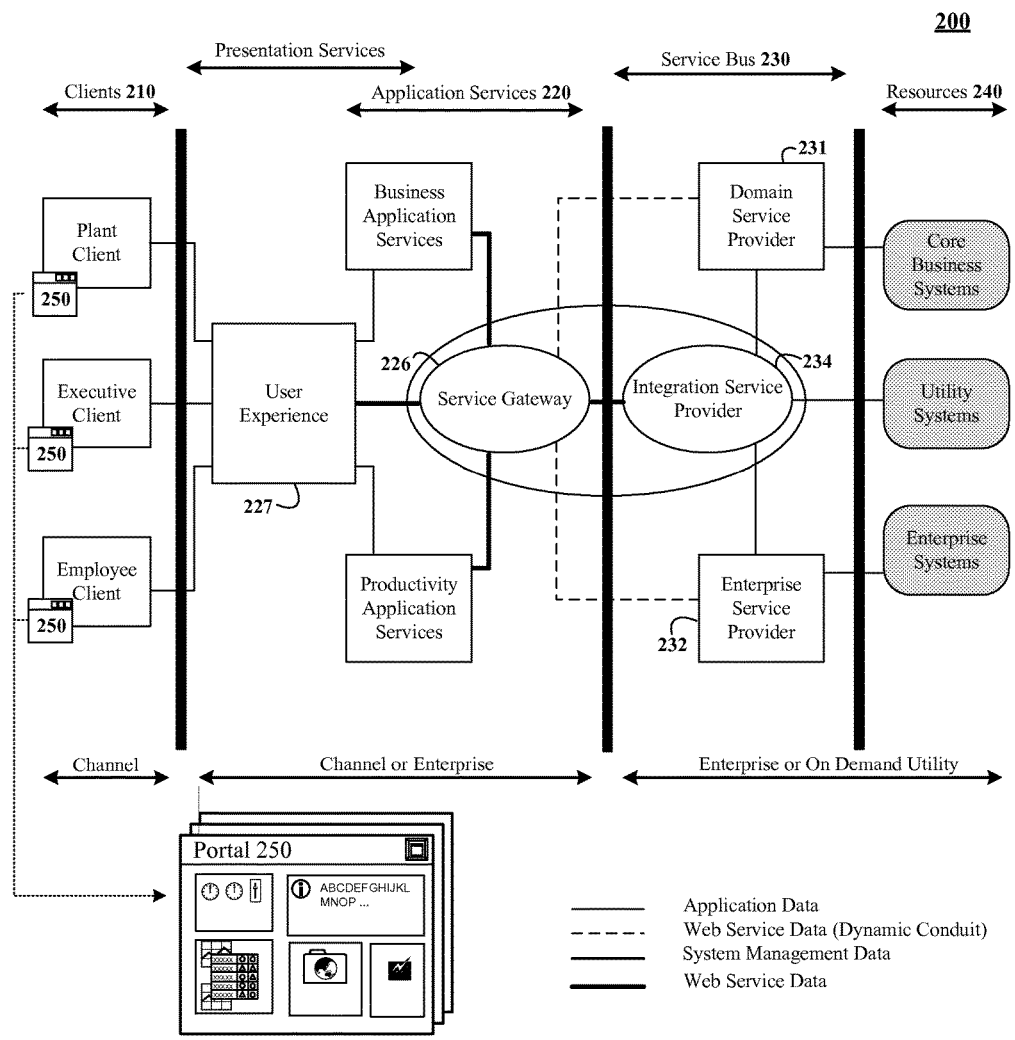
FIG. 2 is a schematic diagram of a service oriented architecture (SOA) implementation of a role tailored portal in accordance with an embodiment of the inventive arrangements shown herein.

FIG. 2 is a schematic diagram of a service oriented architecture (SOA) 200 implementation of a role tailored portal 250 in accordance with an embodiment of the inventive arrangements shown herein. The loosely coupled nature of an SOA 200 can be advantageous in connecting back end resources 240 via a service bus 230 to a service gateway 226 for use by a user experience component 227. The SOA 200 environment can also make customizing user experiences for different clients 210 easier than would be possible with a more rigid architecture.

As shown, for example, a portal 250 workplace and its portlets can map to layer 210 of the SOA 200. Multiple user roles and their associated Web browsers can access the presentation and application services 220. The presentation and application services 220 can include a user experience portal server and various support applications, such as an organizational directory, instant messaging, and content management (library) systems. The SOA 200 can bifurcate presentation services from application services in zone 220, which can foster configurable end-user experiences, while ensuring consistent handling of organizational information.

The resources 240 portion of the SOA can be involved with the provisioning of data required to drive the measurement, historical/trending, and marketplace portions of the portal 250 workplace. Various back end, enterprise-level systems can yield direct or to-be-federated (such as by federation service 182) data. Resource 240 contributions must be fetched, coordinated, and appropriately transformed. The use of domain 231 and enterprise 232 service providers allows the isolation and insulation of back end systems (240), while allowing access to their functions via Web Services interfaces. The integration service provider 234 can integrate information from the other service providers 231-232, and can communicate with a service gateway 226. The service gateway 226 can implement dynamic binding, request/response decomposition/composition, and content based routing of requests generally arriving via Web Services, providing protocol conversion if necessary.

More specifically, the integration service provider 234 can serve as a reference system for service routing and versioning as well as the handler for complex requests and processes not addressable by the service gateway 226. All of these "middleware" and service provider components can combine to standardize, normalize, and flexibly implement the loose coupling that is an SOA strength. All serve to optimize the presentation and application services' 220 access to resources 240; the middleware components 226, 234 may be used to cache retrieved data to preempt full round trips (portal 250 to back end resources 240) for data requests where possible.

Taking the above into account, and for the portal 250 workplace, the presentation and application services 220 can be largely implemented within the portal server and with collaboration technology. The portal server can use client libraries for the conversion of request data formats into ones usable by the middleware 226, 234, firstly by the service gateway 226 for decomposition (many to individuals) and routing. When near real time "dial gauges" are generating requests via AJAX, those end up being transmitted through Web services calls to the service gateway 226, which enables access to data cached within itself or requested of the appropriate resource 240 through the service providers 231, 232. Responses can be sent back to the service gateway 226, which will cache appropriate data and compose a total response to match all facets of an original request. Subsequent requests can be matched with cached data before it expires, thereby extending the time before another "full round trip" through a service provider is necessary.

The same approach as above can be taken for the "marketplace" portion of the portal 250 workplace, as data relating to trading (for example, emissions credits or offsets) and allowance accounts is accessed once again through the user experience portion 227, the service gateway 226, possibly the integration service provider 234 and an appropriate service provider 231-232.

In the cases where multiple service providers 231-232 and back end systems 240 must contribute to federated responses or multi step business processes must be run for analysis or aggregation purposes, the integration service provider 234 can be utilized. Possessing business process choreography capabilities, the integration service provider 234 is able to handle requests involving conversions and synthesis the service gateway 226 cannot. As response routing does go back through the service gateway 226, however, the ability to capture complex results in its cache is still present, and can be leveraged for subsequent requests. An example of a request requiring aggregation of data from various back end resources could be when the portal 250 workplace fetches its past, present, and future information in one request for a historical/trending or scorecard portlet. The integration service provider 234 provides the request breakdown and steps required to access each contributing back end system, and then aggregates the responses to form one "answer."

In summary, the "visible" portion of the system represented by the portal 250 workplace leverages the "invisible" portion provided by the SOA infrastructure 220-240 in order to access the various pieces of data required to drive its mix of portlets. The employment of client-side components for request composition, coupled with the use of content based routing, dynamic binding, multi step request handling, and Web services enablement of back ends contributes to this goal.

It should be emphasized that the architecture 200 is shown for illustrative purposes only and that the scope of the invention is not to be limited in this regard. For instance, other SOA arrangements not having an integration service provider 234 component can be used to implement the portal 250 workplace functionality. Other architecture types, such as a RESTful architecture, can also be used to implement portal 250 workplace functionally in different invention embodiments.

Figure 3:
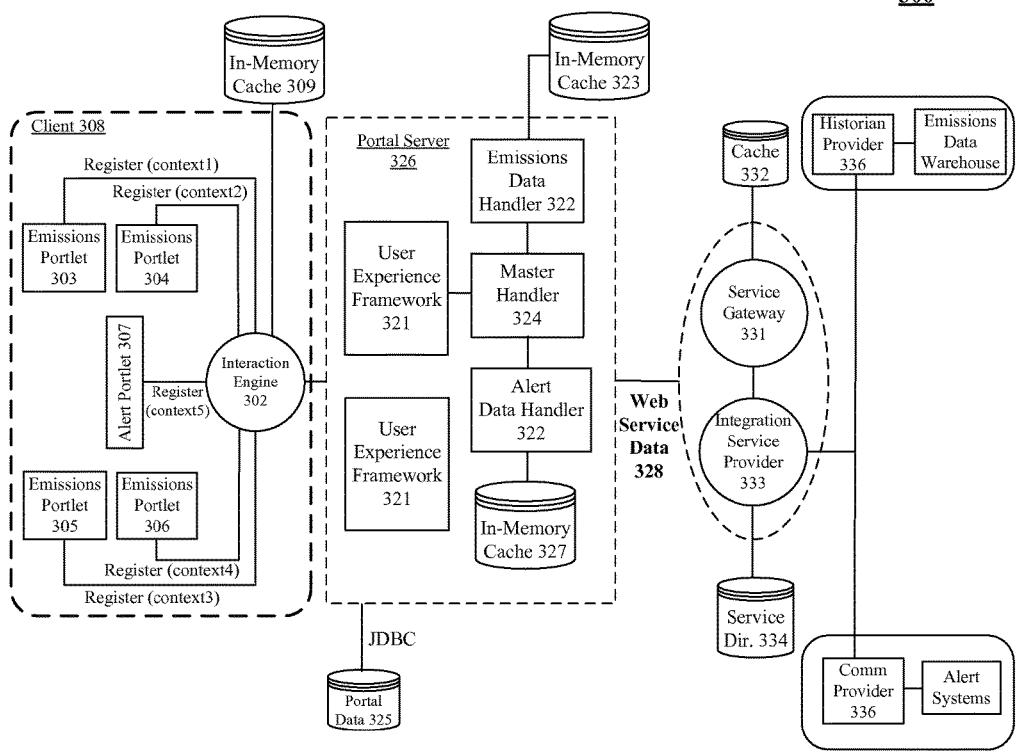
FIG. 3 is a schematic diagram of a system showing a specific implementation of SOA 200 in a context of an emissions dashboard solution.

FIG. 3 is a schematic diagram of a system 300 showing a specific implementation of SOA 200 in a context of an emissions dashboard solution. That is, emissions specific metrics can be presented within emissions portlets 303-306 in a configurable fashion. An interaction engine 302 can compare current emissions metrics against previously defined boundaries to determine if an out-of-bounds event has occurred. If so, an alert to this effect can be posted to an alert portlet 307. Additionally, other portlets (not shown) can respond to the out-of-bounds event. The client 308 upon which the portal is associated can optionally utilize an in-memory cache 309 to improve performance, which can be a significant factor since the emission metrics can be presented in near real time.

For example, each portlet 303-307 of client 308 can utilize interaction engine 302 to interface with the portal server 326. In-memory cache or data store 309 can be used to store information specifying data sources for updating the portlets 303-307, such as URLs for associated Web sites. Data store 309 can also separately store and track foreground (presented) version information for the portlets 303-307 and background (hidden) version information.

The portal server 326 of system 300 can include a user experience framework 321, a master handler 324, and emissions and alert data handlers 322. Caches 323, 327 and data store 325 contain information which can also be used by the portal server 326. The client 308 can communicate with portal server 326 via a network infrastructure (not shown). Authorization engines (not shown) can ensure security of portlet data.

User experience framework or engines 321 can interface with specific clients 308. The user experience engines 321 can be communicatively linked to a registration handler (not shown), a master handler 324, and data handlers 322, as shown. Each data handler 322 can be associated with a memory cache 323 and/or 327, which stores frequently updated data and other pertinent update frequency information. Handlers can together ensure that data presented within client 308 portlets and obtained from providers 336 is continuously updated.

In one embodiment, user experience engines 321 can customize enterprise content for specific user roles or communication channels, such as a customer channel, an employee channel, a management channel, an IT administrator channel, and the like. The communication channels can also be linked to different market channels, such as employee systems, kiosks, self-service Web sites, and the like. Accordingly, the user experience engines 321 can customize streams of enterprise data obtained from an enterprise infrastructure for different front-end systems. Segmenting enterprise data from different front end systems used by clients 308 in such a loosely coupled fashion ensures that enterprise data can be utilized by different separately customizable systems without negatively affecting back-end systems.

Information can be conveyed as Web service data 328 to the portal server 326 via a service gateway 331, which can be connected to an integration service provider 333. Other providers 336 can exist, which communicate with the gateway 331 and/or the integration service provider 333. A service directory 334 can specify the types of services available to system 300. Middleware components 331, 333 can optionally use one or more memory caches 332 to improve system 300 performance.

Figure 4:
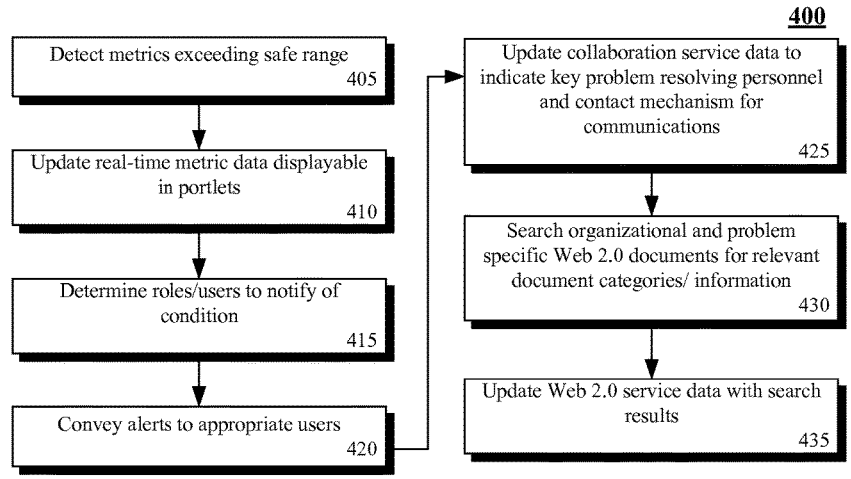
FIG. 4 is a flow chart of a method for customizing portal content based upon metric values, such as when an out-of-bounds event occurs.

FIG. 4 is a flow chart of a method 400 for customizing portal content based upon metric values, such as when an out-of-bounds event occurs. The method 400 can be performed in the context of system 100.

Method 400 can begin in step 405, where a portal service (e.g., decision service 186) can detect that current metrics exceed a safe range defined using previously established boundary values, which can be configured by a user or system. This detection can trigger an out-of-bounds event. In step 410, a data store (such as cache 323) can be updated with the metric data, which ultimately enables this data to potentially be displayed within client portlets in near real time. The client portlets can include a dashboard and/or a scorecard. In step 415, a set of roles/users that are to be notified of the occurrence of the out-of-bounds event can be determined. In step 420, alerts can be conveyed to the appropriate users determined in step 415. Alerts can be presented within an alert portlet (e.g., portlet 128) of a portal workplace 110-114 or can be automatically conveyed through another means.

Different contact rules and mechanisms can be established to more aggressively contact key users depending on the severity of the out-of-bounds event and its significance to an organization. For example, when the out-of-bounds event is routine, the alert portlet alone can be a contact mechanism of choice. When an out-of-bounds event is highly significant, email, fax, text messages, voice messages, paging, and the like can be used to contact suitable response personnel and to inform them of the occurrence of the out-of-bounds event. This can enable the contacted personnel to go online and receive more detailed information via a customized portal.

In step 425, collaboration service data can be updated to indicate key problem resolving personnel and contact mechanisms for communications. For example, a plant manager can instantly be presented with contact information via a collaboration portal that shows maintenance personnel qualified to resolve the out-of-bounds event. Collaboration services can also indicate availability of key decision makers, who are to be contacted (such as through a group chat session) to ensure a rapid and coordinated response. In step 430, a Web 2.0 repository of documents can be searched for relevant information relating to the out-of-bounds event. This information can be placed in a data store in step 435, which can be used to populate Web 2.0 portlets for appropriate personnel.

For example, a plant manager can be presented with a WIKI detailing proper plant-level protocol for responding to the out-of-bounds event. A maintenance worker logging onto the organizational portal can be presented with maintenance manuals, repair BLOG entries, and the like relevant for his/her tasks in resolving the out-of-bounds event. This example shows that information provided in a portal related to the out-of-bounds event can be role tailored to be relevant for a particular user.

Figure 5:
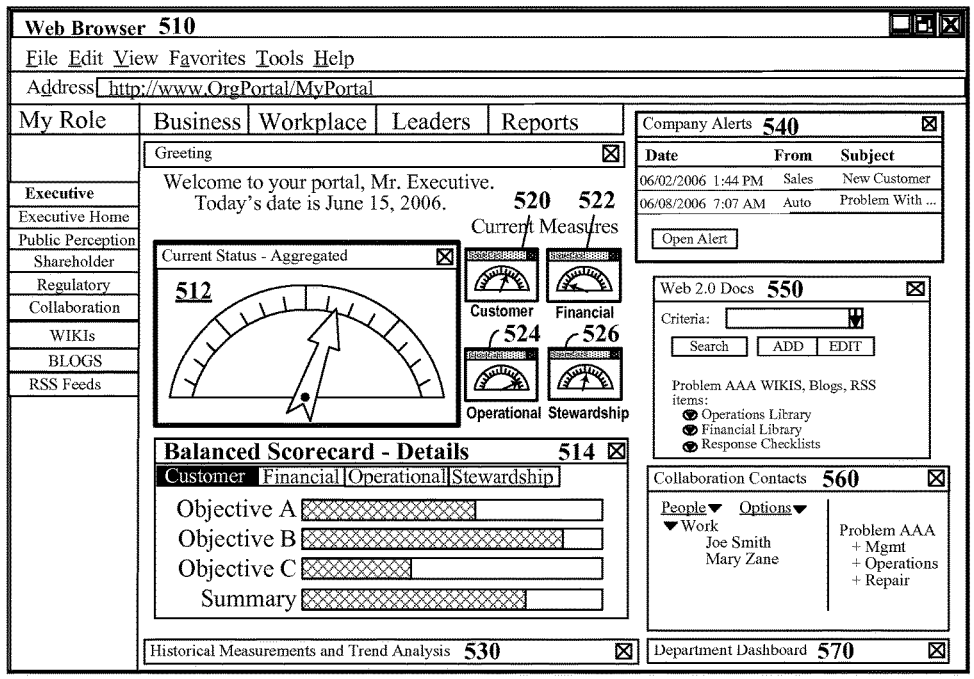
FIG. 5 shows a sample role tailored Web browser or portal interface for integrating retrieved metrics, business measures, online collaboration, and Web 2.0 content in accordance with an embodiment of the inventive arrangements disclosed herein.

FIG. 5 shows a sample role tailored Web browser or portal interface 510 for integrating metrics, business measures, online collaboration, and Web 2.0 content in accordance with an embodiment of the inventive arrangements disclosed herein. The interface 510 can be an instance specific example of portal 110-114 from system 100. That is, the portal shown in interface 510 can provide a role based, tailored user experience for ensuring compliance with the previously established boundaries for the metrics. Different roles supported by the Web portal interface 510 can include, for example, operations, supervisory, policy making, and executive roles. Each role can have different data needs that are expressed within the interface 510 in a role specific manner.

As shown, interface 510 can include a set of metric portlets 512, 520, 522, 524, 526, and 570, each able to present near real time metrics. Metric portlets 512, 520, 522, 524, 526, and 570 can include graphical widgets that show current values relative to "normal" operational boundary conditions. Data presented in the portlets 512, 520, 522, 524, 526, and 570 can be based upon sensor readings and/or a federation of data from multiple sources. The metric portlets 512, 520, 522, 524, 526, and 570 are not limited to graphical expressions, and tables of data, charts, summaries, and the like can also be presented. In one embodiment, each of the metric portlets 512, 520, 522, 524, 526, and 570 can be configured to drill-down to various levels of detail.

Metric portlets 512, 520, 522, 524, 526, and 570 within a dashboard portal can be joined by one or more scorecard portlets 514. Each scorecard can show how at least one strategic business concern or objective is measured over time against at least one metric. Each dashboard can show how at least one tactical business concern is measured against at least one near real time metric. Each portlet 512-526, 570 can be associated with a portlet specific service, which can be used to customize portlet 512-526, 570 behavior, data sources, refresh rates, and the like. One or more of the portlets 512-526, 570 can be synchronized with one or more other portlets 512-526, 570 to ensure data currency is maintained among the different portlets 512-526, 570. Each scorecard portlet can be associated with an objective management service backed by data services that feed the aggregation of long term measures.

In one embodiment, one of the scorecards 514 can be a balanced scorecard that focuses upon financial, operational, development, internal process performance, market share, market penetration, staff skill level, and other strategic concerns. In such an embodiment, the different concerns can be categorized as relating to customers, finances, operations, and stewardship. The different perspectives and categories can be configured as desired. A balanced scorecard can link critical success factors to key performance indicators, thus translating strategic objectives to operational actions.

Each scorecard 514 can be associated with a set of objectives. Each objective can have a running total or aggregated total associated with it. Each objective can be tied to or more remote data sources, which uses a service to continuously update values. The various scorecards 514, objectives, and the like can be selectable by a user, which results in additional related information being presented.

Within an organization, a set of dependent and consistent objectives can be established. Applicable ones of the objectives within the hierarchy of objectives can depend upon a user's role within an organization. Thus, different objectives are presentable to different users logging into the portal 510 in a role tailored fashion. In one embodiment, business rules can be programmatically established for different scorecard threshold values, which results in context specific advice being presented.

Portlet 530 can be a historical measurement and/or trend analysis portlet, which presents historical and/or forecast information related to near real time metrics. Portlet 530 information can quickly permit a user to put current metric values in context, which can facilitate the making of an appropriate and timely response to an out of bounds event or situation likely to result in an out of bounds event.

The alerts portlet 540 can automatically present notifications to a set of organizationally associated users whenever metrics exceed a set of previously established boundaries. Other organizational personnel can also post alerts directed towards specific users and/or user groups.

The Web 2.0 portlet 550 can be used to access a set of shared documents relevant to an organization. Entries available through portlet 550 can be designed to provide insight required to make tactical and strategic decisions to achieve metric driven value targets, to maintain metrics within safe operational ranges relative to a set of previously established boundaries, and/or to otherwise conduct user specific organizational tasks.

The collaboration portlet 560 can facilitate communications among organizationally associated users through various online and external communications channels.

The portlets shown in interface 510 are not intended to be comprehensive. Additionally, design choices for interface 510 are arbitrary and the use of other design choices falls within the scope of the disclosed invention.

Figure 9:
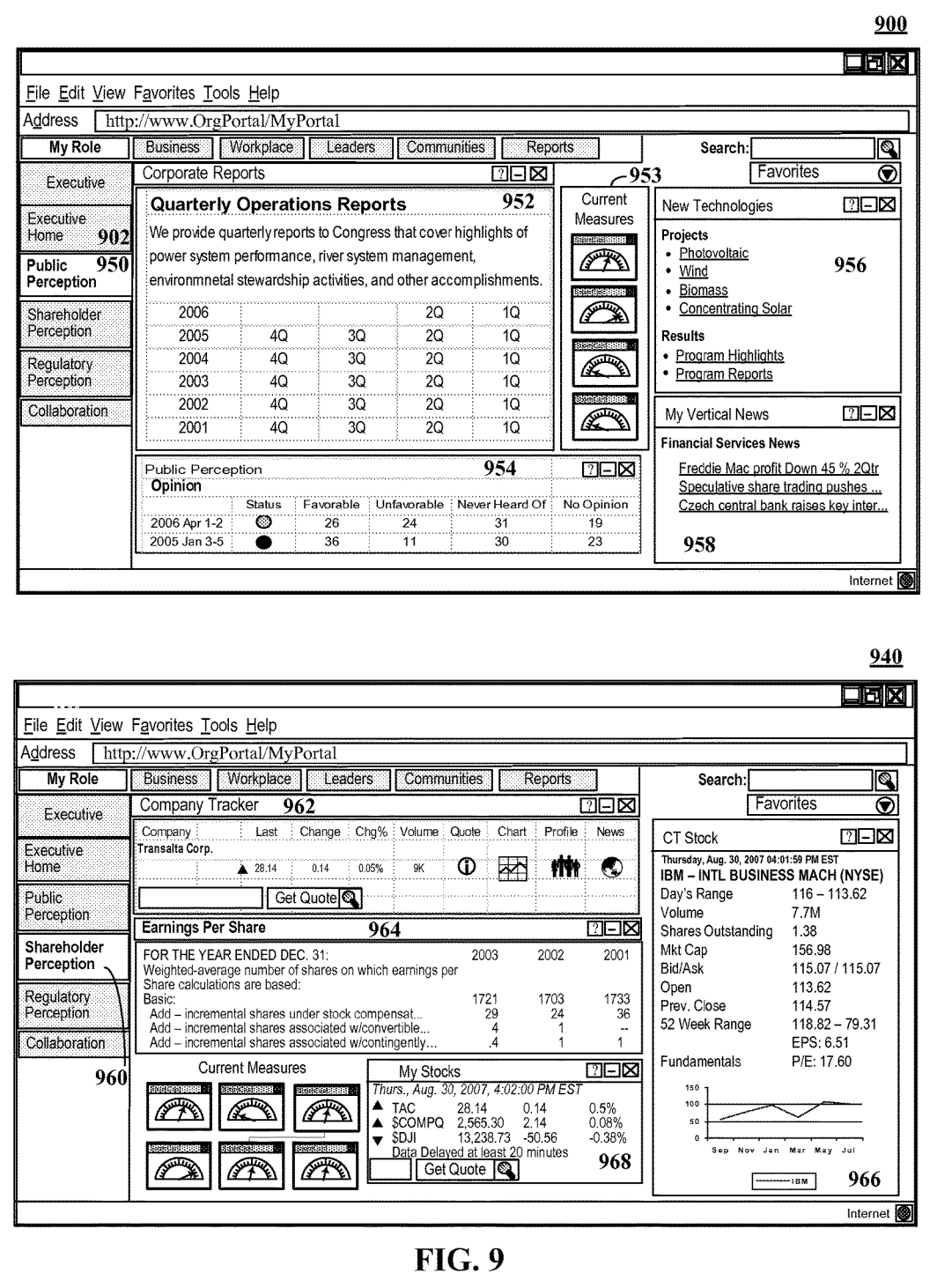

FIGS. 6, 7, 8, and 9 show sample portal interfaces for an emissions dashboard portal, which is one of many contemplated/potential uses for the disclosed invention. The portal interfaces of FIGS. 6, 7, 8, and 9 specifically show several renderings of an emissions dashboard portal to correspond to a number of different supported user roles. These roles include a plant-level operator (FIG. 6), a plant manager (FIG. 7), a mid level policy maker (FIG. 8), and an executive (FIG. 9). The elements and concepts expressed for the emissions dashboard example should be broadly interpreted to be applicable to any metrics driven portal. Metrics portlets can include scorecard and/or dashboard portlets, specifics of which can vary by role.

Figure 6:
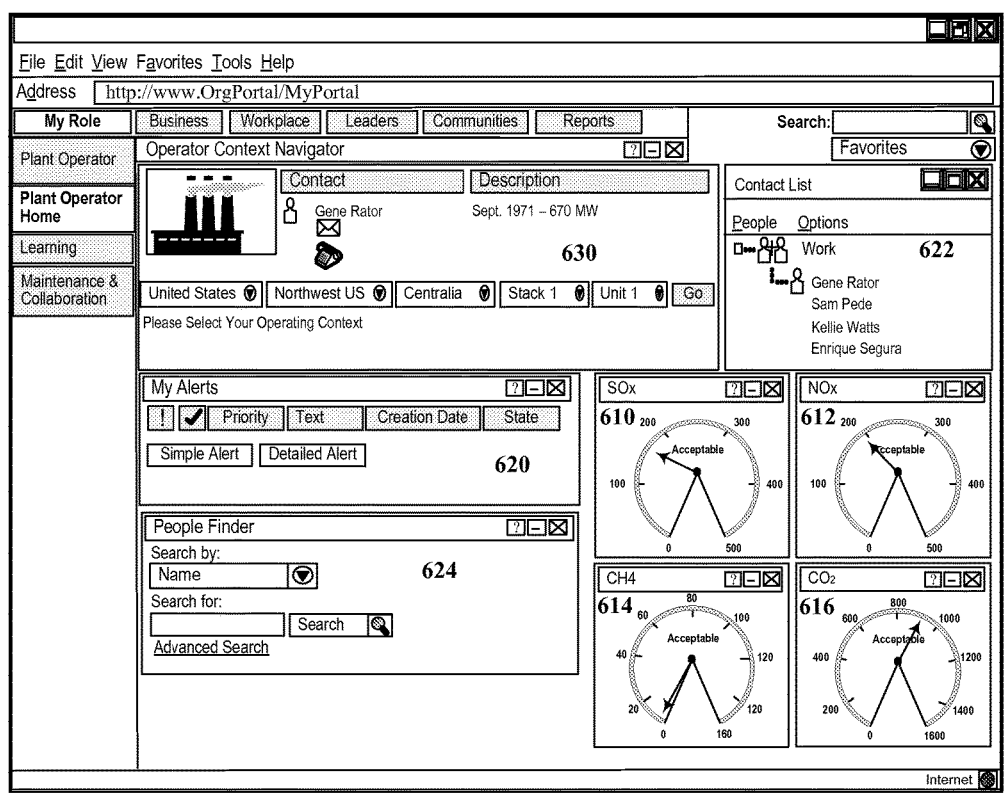
FIG. 6 illustrates a role tailored emissions dashboard portal configured for a plant unit level operator role in accordance with an embodiment of the inventive arrangements disclosed herein.

FIG. 6 illustrates a role tailored emissions dashboard portal 600 configured for a plant operator role in accordance with an embodiment of the inventive arrangements disclosed herein. A plant operator can be concerned with the overall status of units within a plant. Hence, the portal 600 can be configured to provide an overview of unit performance in the context of the local plant.

Portal 600 can include a set of emissions portlets 610-616, an optional scorecard portlet (not shown), an alert portlet 620, an instant messaging (collaboration) portlet 622, a people finder portlet 624, and a navigation portlet 630.

Figure 7:
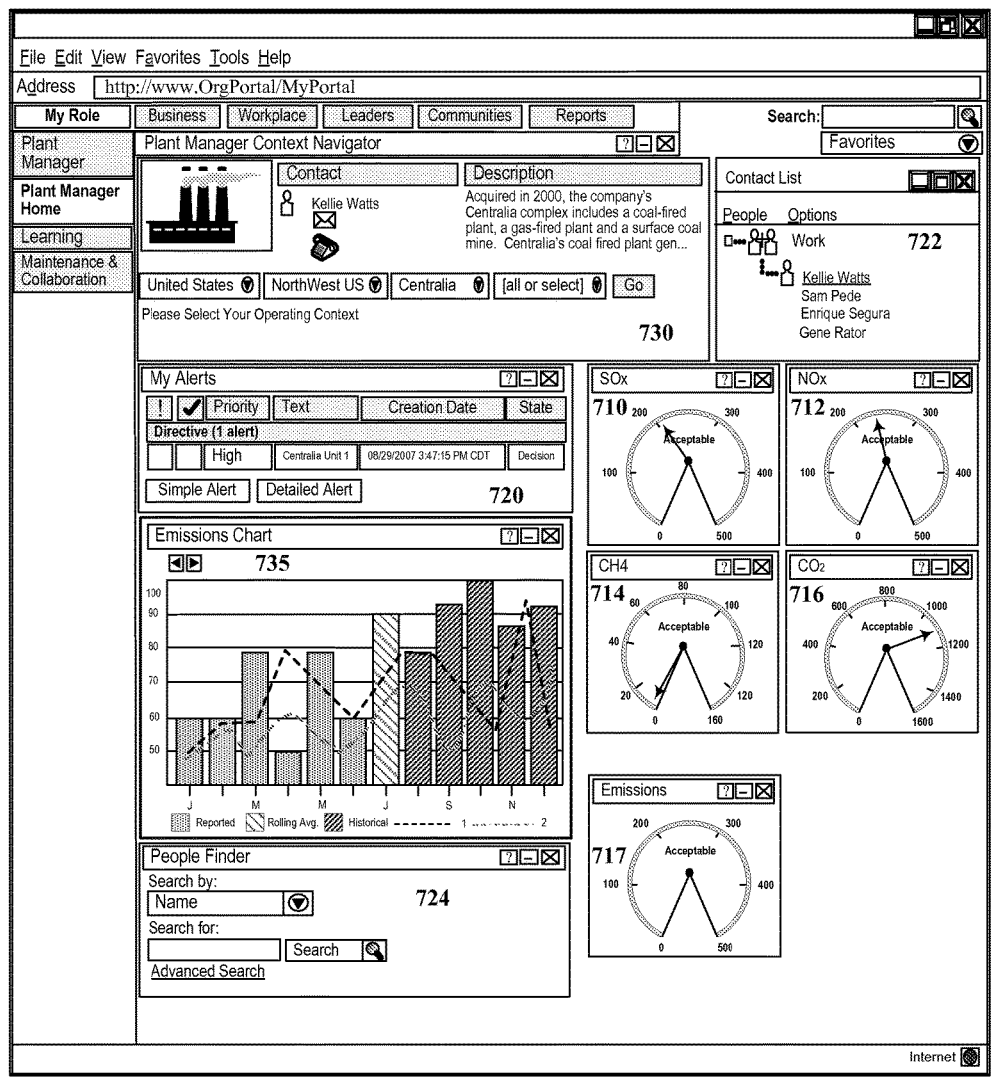
FIG. 7 illustrates a role tailored emissions dashboard portal configured for a plant manager role in accordance with an embodiment of the inventive arrangements disclosed herein.

FIG. 7 illustrates a role tailored emissions dashboard portal 700 configured for a plant manager role in accordance with an embodiment of the inventive arrangements disclosed herein. Although portal 700 can be similar to portal 600, a plant manager can be more concerned with broader details of his/her plant as well as broader organizational matters than a plant operator.

As shown, portal 700 can include a set of emissions portlets 710-716, an aggregate emission portlet 717, an alert portlet 720, an instant messaging (collaboration) portlet 722, a people finder portlet 724, a navigation portlet 730, and a historical emissions portlet 735. Content contained in each portlet 710-735 can vary from content of portlets 610-630, due to different roles. For example, a set of alerts directed towards plant operators can be different than a set of alerts for plant managers. The addition of the aggregate 717 and historical 735 emissions portlets illustrates an increased focus on overall plant details for portal 700 compared to portal 600.

Figure 8:
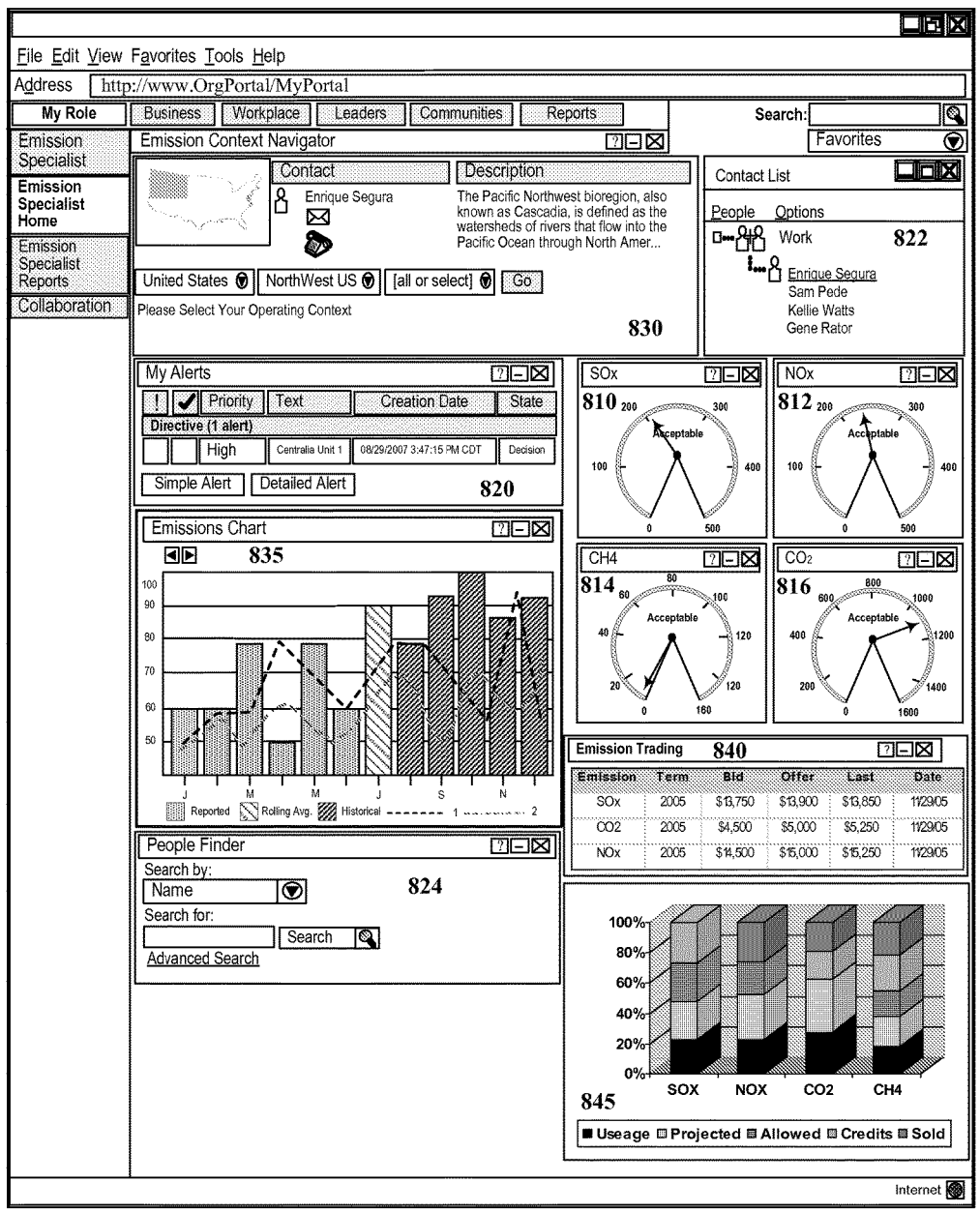
FIG. 8 illustrates a role tailored emissions portal configured for a policy maker user role in accordance with an embodiment of the inventive arrangements disclosed herein.

FIG. 8 illustrates a role tailored emissions portal configured for a policy maker user role in accordance with an embodiment of the inventive arrangements disclosed herein. More specifically, the policy maker role can be a financial one concerned with emissions offset trading shown by portlet 840 and with emissions accounts shown by portlet 845. The remaining portlets 810-835 can be identical in nature to analogous ones shown in portal 700, other than the presented content is tailored for a different user having a different role within the organization.

FIG. 9 illustrates a role tailored emissions portal 900, 940 configured for an executive user role in accordance with an embodiment of the inventive arrangements disclosed herein. FIG. 9 shows a selection of a portal tab 950, 960 other than a home tab (902 in this case), which is shown for FIGS. 6-8. The home tab 902 for FIG. 9 can present equivalent portlets to those of the home tab of portlet 800, other than having content tailored for a different role and user.

As an example, when a public perception tab 950 of portal 900 is selected by an executive user, interface 900 can be presented. Interface 900 can include a quarterly report portlet 952, a set of current emissions portlets 953, a public perception portlet 954, a new technologies portlet 956, and a news portlet 958.

When a shareholder perception tab 960 of portal 900 is selected, interface 940 can be presented. Interface 940 can show a company stock tracker portlet 962, an earnings per share portlet 964, an organization stock report portal 966, and a user's stock portfolio portlet 968.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, while the invention has been discussed in the context of a visual system, it is intended that the inventive concepts disclosed and claimed herein apply to other means of perception other than visual perception, allowing the invention to be adapted for use by people who may be visually impaired.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
within a service oriented architecture, connecting back end resources to a service gateway via a bus;
mapping an organization Web portal to a client layer connected to a user experience component that is coupled to the service gateway, wherein the user experience component is a presentation service within the service oriented architecture, wherein the service gateway is a middleware component of the service oriented architecture that preempts round trips for data requests generated by the organizational Web portal by caching retrieved data from a plurality of discrete services and implementing dynamic binding, request/response decomposition/composition, and content based routing of requests arriving at Web Services;
determining strategic business objectives and indicators of the organization;
receiving a plurality of metrics captured by a plurality of discrete services, wherein the plurality of discrete services include a plurality sensors linked to a plurality of organization assets;
federating, by the plurality of discrete services, the data retrieved by the plurality of discrete services into portlets in a manner specific to roles of users within the organization;
logging a user into the organization Web portal;
determining an organization role for the user;
graphically presenting, within a plurality of metrics driven portlets of the organization Web portal, indicators of metric values obtained from the plurality of sensors linked to a plurality of organization assets, the plurality of metrics specific to the determined organization role of the user, the plurality of metrics driven portlets comprising at least one scorecard and at least one dashboard, each tailored for the determined organizational role of the user;
receiving an additional plurality of metrics from the plurality of sensors linked to a plurality of organization assets and dynamically updating the scorecard and the dashboard based upon these metrics;
detecting whether at least one of the plurality of metrics exceeds a boundary condition by comparing the plurality of metrics to defined boundaries for the metrics;
responsive to detecting that the at least one of the plurality of metrics exceeds the boundary condition:
programmatically determining that the user is to be apprised of an occurrence of the out-of-bounds event;
triggering an out-of-bounds event that automatically searches a database for documents relevant to the out-of-bounds event wherein the relevant documents comprise a plant-level protocol for responding to the out-of-bounds event that is specific to the organizational role of the user;
importing the contents of the plant-level protocol for responding to the out-of-bounds event into at least one of the portlets for user by the user.

2. The method of claim 1, further comprising:
searching the Web data repository for maintenance manuals or repair BLOG entries relevant to tasks assigned to the user; and
altering the contents of the at least one of the portlets to include the maintenance manuals or repair BLOG entries relevant to the tasks assigned to the user.

3. The method of claim 1, wherein the discrete services obtain the metrics from a plurality of geographically distributed data sources, wherein the plurality of discrete services are functionally independent of each other and are responsible for federating data in a portlet and role specific manner, wherein the scorecard shows at least one strategic business concern that is measured against at least one of the metrics from the plurality of geographically distributed data sources, wherein the dashboard shows at least one tactical business concern that is measured against at least one metric from the plurality of geographically distributed data sources.

4. The method of claim 1, further comprising:
receiving, by the scorecard or the dashboard, a user input from the user; and
responsive to the scorecard or the dashboard receiving the user input, establishing the boundary condition.

5. The method of claim 1, further comprising:
constructing a role specific alert message for the user; and
presenting within a user specific version of the organization portal the constructed alert message.

6. A system, comprising:
a processor programmed to initiate executable operations comprising:
within a service oriented architecture, connecting back end resources to a service gateway via a bus;
mapping an organization Web portal to a client layer connected to a user experience component that is coupled to the service gateway, wherein the user experience component is a presentation service within the service oriented architecture, wherein the service gateway is a middleware component of the service oriented architecture that preempts round trips for data requests generated by the organizational Web portal by caching retrieved data from a plurality of discrete services and implementing dynamic binding, request/response decomposition/composition, and content based routing of requests arriving at Web Services;
determining strategic business objectives and indicators of the organization;
receiving a plurality of metrics captured by a plurality of discrete services, wherein the plurality of discrete services include a plurality sensors linked to a plurality of organization assets;
federating, by the plurality of discrete services, the data retrieved by the plurality of discrete services into portlets in a manner specific to roles of users within the organization;
logging a user into the organization Web portal;
determining an organization role for the user;
graphically presenting, within a plurality of metrics driven portlets of the organization Web portal, indicators of metric values obtained from the plurality of sensors linked to a plurality of organization assets, the plurality of metrics specific to the determined organization role of the user, the plurality of metrics driven portlets comprising at least one scorecard and at least one dashboard, each tailored for the determined organizational role of the user;
receiving an additional plurality of metrics from the plurality of sensors linked to a plurality of organization assets and dynamically updating the scorecard and the dashboard based upon these metrics;
detecting whether at least one of the plurality of metrics exceeds a boundary condition by comparing the plurality of metrics to defined boundaries for the metrics;
responsive to detecting that the at least one of the plurality of metrics exceeds the boundary condition:
programmatically determining that the user is to be apprised of an occurrence of the out-of-bounds event;
triggering an out-of-bounds event that automatically searches a database for documents relevant to the out-of-bounds event wherein the relevant documents comprise a plant-level protocol for responding to the out-of-bounds event that is specific to the organizational role of the user;
importing the contents of the plant-level protocol for responding to the out-of-bounds event into at least one of the portlets for user by the user.

7. The system of claim 6, the executable operations further comprising:
searching the Web data repository for maintenance manuals or repair BLOG entries relevant to tasks assigned to the user; and
altering the contents of the at least one of the portlets to include the maintenance manuals or repair BLOG entries relevant to the tasks assigned to the user.

8. The system of claim 6, wherein the discrete services obtain the metrics from a plurality of geographically distributed data sources, wherein the plurality of discrete services are functionally independent of each other and are responsible for federating data in a portlet and role specific manner, wherein the scorecard shows at least one strategic business concern that is measured against at least one of the metrics from the plurality of geographically distributed data sources, wherein the dashboard shows at least one tactical business concern that is measured against at least one metric from the plurality of geographically distributed data sources.

9. The system of claim 6, the executable operations further comprising:
receiving, by the scorecard or the dashboard, a user input from the user; and
responsive to the scorecard or the dashboard receiving the user input, establishing the boundary condition.

10. The system of claim 6, the executable operations further comprising:
constructing a role specific alert message for the user; and
presenting within a user specific version of the organization portal the constructed alert message.

11. A computer program product comprising a computer readable storage medium having program code stored thereon, wherein the computer readable storage medium is not a propagating signal, transitory signal per se, the program code executable by a processor to perform a method comprising:
within a service oriented architecture, connecting back end resources to a service gateway via a bus;
mapping an organization Web portal to a client layer connected to a user experience component that is coupled to the service gateway, wherein the user experience component is a presentation service within the service oriented architecture, wherein the service gateway is a middleware component of the service oriented architecture that preempts round trips for data requests generated by the organizational Web portal by caching retrieved data from a plurality of discrete services and implementing dynamic binding, request/response decomposition/composition, and content based routing of requests arriving at Web Services;
determining strategic business objectives and indicators of the organization;
receiving a plurality of metrics captured by a plurality of discrete services, wherein the plurality of discrete services include a plurality sensors linked to a plurality of organization assets;
federating, by the plurality of discrete services, the data retrieved by the plurality of discrete services into portlets in a manner specific to roles of users within the organization;
logging a user into the organization Web portal;
determining an organization role for the user;
graphically presenting, within a plurality of metrics driven portlets of the organization Web portal, indicators of metric values obtained from the plurality of sensors linked to a plurality of organization assets, the plurality of metrics specific to the determined organization role of the user, the plurality of metrics driven portlets comprising at least one scorecard and at least one dashboard, each tailored for the determined organizational role of the user;

receiving an additional plurality of metrics from the plurality of sensors linked to a plurality of organization assets and dynamically updating the scorecard and the dashboard based upon these metrics;

detecting whether at least one of the plurality of metrics exceeds a boundary condition by comparing the plurality of metrics to defined boundaries for the metrics;

responsive to detecting that the at least one of the plurality of metrics exceeds the boundary condition:

programmatically determining that the user is to be apprised of an occurrence of the out-of-bounds event;

triggering an out-of-bounds event that automatically searches a database for documents relevant to the out-of-bounds event wherein the relevant documents comprise a plant-level protocol for responding to the out-of-bounds event that is specific to the organizational role of the user;

importing the contents of the plant-level protocol for responding to the out-of-bounds event into at least one of the portlets for user by the user.

12. The computer program product of claim 11, the method further comprising:

searching the Web data repository for maintenance manuals or repair BLOG entries relevant to tasks assigned to the user; and altering the contents of the at least one of the portlets to include the maintenance manuals or repair BLOG entries relevant to the tasks assigned to the user.

13. The computer program product of claim 11, wherein the discrete services obtain the metrics from a plurality of geographically distributed data sources, wherein the plurality of discrete services are functionally independent of each other and are responsible for federating data in a portlet and role specific manner, wherein the scorecard shows at least one strategic business concern that is measured against at least one of the metrics from the plurality of geographically distributed data sources, wherein the dashboard shows at least one tactical business concern that is measured against at least one metric from the plurality of geographically distributed data sources.

14. The computer program product of claim 11, the method further comprising:

receiving, by the scorecard or the dashboard, a user input from the user; and responsive to the scorecard or the dashboard receiving the user input, establishing the boundary condition.

15. The computer program product of claim 11, the method further comprising:

constructing a role specific alert message for the user; and presenting within a user specific version of the organization portal the constructed alert message.

* * * * *